United States Patent [19]

Uchida et al.

[11] Patent Number: 5,583,244

[45] Date of Patent: Dec. 10, 1996

[54] SILOXANE-CONTAINING PULLULAN AND METHOD FOR THE PREPARATION THEREOF

[75] Inventors: Satoshi Uchida, Niigata-ken; Akira Yamamoto, Gunma-ken; Ikuo Fukui, Niigata-ken; Mikio Endo, Niigata-ken; Hiroshi Umezawa, Niigata-ken; Shigehiro Nagura, Niigata-ken; Tohru Kubota, Niigata-ken, all of Japan

[73] Assignee: Shin-Etsu Chemical Co., Ltd., Tokyo, Japan

[21] Appl. No.: 551,807

[22] Filed: Nov. 7, 1995

[30] Foreign Application Priority Data

Nov. 8, 1994 [JP] Japan .................................. 6-273785
Apr. 20, 1995 [JP] Japan .................................. 7-94645

[51] Int. Cl.$^6$ ................................................ C07F 7/10
[52] U.S. Cl. .................... 556/419; 556/420; 536/123.12
[58] Field of Search .................... 556/419, 420; 536/123.12

[56] References Cited

U.S. PATENT DOCUMENTS 3,931,146  1/1976  Kato et al. .................... 536/123.12
5,256,706  10/1993  Carpenter et al. .................... 556/419 X

*Primary Examiner*—Paul F. Shaver
*Attorney, Agent, or Firm*—Millen, White, Zelano, & Branigan, P.C.

[57] ABSTRACT

Disclosed is a novel organosilicon-containing derivative of pullulan of which an organopolysiloxane moiety having a silethylene linkage is bonded to the glucose residue of pullulan through a urethane linkage. Different from conventional organopolysiloxane-modified pullulans, the inventive derivative is stable against attack of water and exhibits unique properties as a combination of the properties inherent in pullulan and in silicones. The organosilicon-containing pullulan of the invention can be easily prepared under mild reaction conditions by reacting an isocyanato group-containing organopolysiloxane with the glucosic hydroxy groups of pullulan.

10 Claims, 2 Drawing Sheets

SILOXANE-CONTAINING PULLULAN AND METHOD FOR THE PREPARATION THEREOF

BACKGROUND OF THE INVENTION

The present invention relates to a siloxane-containing pullulan as a novel and stable material having properties inherent in both of pullulan and a silicone in combination and a method for the preparation thereof.

Several attempts have been made and reported for the reaction of an organosilicon compound with pullulan to prepare a composition with which the unique properties inherent in these starting materials are exhibited in combination while none of the prior art methods are quite satisfactory with various problems including the low reactivity of the reactants. For example, Japanese Patent Kokai 5-145521 discloses a trimethylsilyl pullulan as a modified pullulan containing organosilicon groups, which, however, is unstable against attack of water. In addition, the desirable combination of the properties inherent in the respective constituents is not obtained therein so that none of such a pullulan derivatives are currently under practical applications.

SUMMARY OF THE INVENTION

The present invention accordingly has an object, by solving the above described problems in the prior art, to provide a novel siloxane-containing pullulan which is chemically stable against attack of water and capable of exhibiting unique properties as a combination of the properties inherent in the starting reactants of pullulan and a silicone compound as well as a method for the preparation of such a siloxane-containing pullulan with a high efficiency of the reaction.

Thus, the siloxane-containing pullulan provided by the invention is a compound having a molecular weight in the range from 50,000 to 10,000,000 and represented by the general formula $$PL-CO-NH-(CH_2)_n-(-SiR^1_2-O-SiR^1_2-CH_2CH_2-)_a-SiR^1_b(-O-SiR^2_3)_{3-b},\quad (I)$$

in which PL— denotes a glucose residue of pullulan, each $R^1$ is a monovalent hydrocarbon group having 1 to 10 carbon atoms or, preferably, a methyl group, each $R^2$ is a monovalent hydrocarbon group having 1 to 10 carbon atoms or, preferably, a methyl group or a triorganosiloxy group represented by the general formula $-O-SiR^3_3$, each $R^3$ being a monovalent hydrocarbon group having 1 to 8 carbon atoms or, preferably, a methyl group, the subscript n is a positive integer not exceeding 10 or, preferably, 3, the subscript a is 0 or 1 and the subscript b is 0, 1 or 2. The glucose residue denoted by PL here implied is a group derived from the molecule of pullulan from which the hydrogen atom of at least one glucosic hydroxy group therein is removed.

In particular, the inventive siloxane-containing pullulan is, in a first aspect, represented by the above given general formula in which, however, the subscript a is zero so that the compound can be represented by the general formula $$PL-CO-NH-(CH_2)_n-SiR^1_b(-O-SiR^2_3)_{3-b},\quad (II)$$

in which each symbol has the same meaning as defined above.

In further particular, the inventive siloxane-containing pullulan is, in a second aspect, represented by the above given general formula in which, however, $R^2$ is $R^1$, the subscript a is 1 and the subscript b is 2 so that the compound can be represented by the general formula $$PL-CO-NH-(CH_2)_n-SiR^1_2-O-SiR^1_2-CH_2CH_2-SiR^1_2-O-SiR^1_3\quad (III)$$

in which each symbol has the same meaning as defined above.

The above defined siloxane-containing pullulan can be prepared by reacting an isocyanato group-containing organosiloxane compound represented by the general formula $$O=C=N-(CH_2)_n-(-SiR^1_2-O-SiR^1_2-CH_2CH_2-)_a-SiR^1_b(-O-SiR^2_3)_{3-b},\quad (IV)$$

in which each symbol has the same meaning as defined above, with at least one glucosic hydroxy group in the molecule of pullulan.

DETAILED DESCRIPTION OF THE PREFERRED EMBODIMENTS

Figure 1:
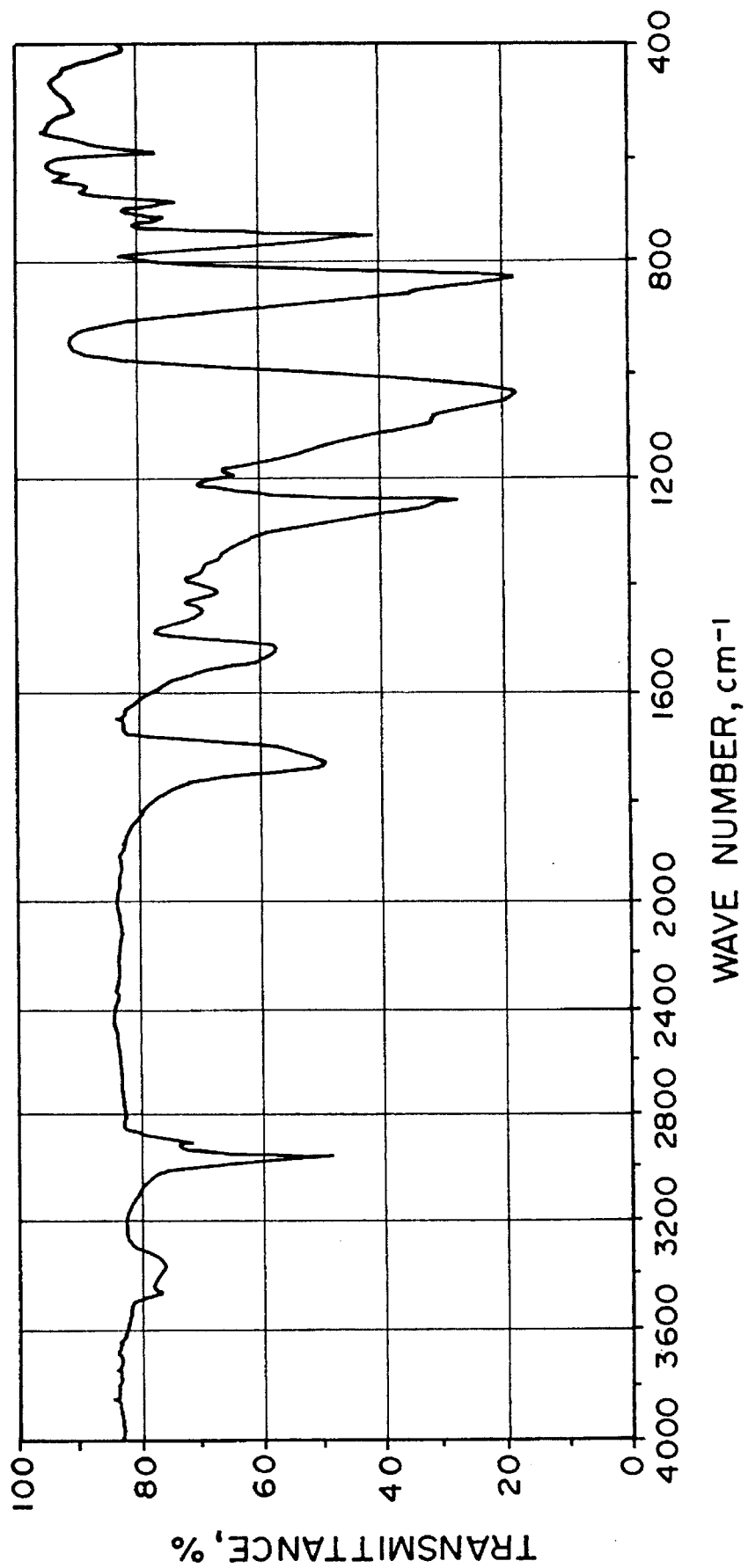
FIGS. 1 and 2 are each an infrared absorption spectrum of the siloxane-containing pullulans prepared in Examples 1 and 2, respectively.

As is described above, the siloxane-containing pullulan of the invention has a molecular structure which is a urethane compound formed by the urethane linkage-forming reaction of an N-organosilylalkyl isocyanate of the general formula (IV) and pullulan having glucosic hydroxy groups. The reaction can readily proceed under moderate reaction conditions between an isocyanato group-containing organopolysiloxane of the general formula (IV) and one or more of the glucosic hydroxy groups in the pullulan molecules.

The above defined novel siloxane-containing pullulan has been unexpectedly discovered as a result of the extensive investigations undertaken by the inventors with an object to obtain a novel pullulan derivative exhibiting unique properties as a combination of the properties inherent in pullulan and in a silicone compound after establishment of the reaction conditions between the glucosic hydroxy groups in pullulan and an isocyanato group-containing organosiloxane compound. Namely, the siloxane-containing pullulan of the invention exhibits the film-forming behavior and toughness of pullulan in combination with the elasticity, gas permeability and the like of silicones in general to be soluble in various organic solvents. Accordingly, the siloxane-containing pullulan of the invention is useful as a material of a gas-separation membrane, additive in cosmetic and toiletry compositions, adhesives, fiber finishing agents and so on.

One of the reactants in the preparation of the inventive siloxane-containing pullulan is a pullulan which is a kind of polysaccharide consisting of glucose units. Though not particularly limitative, the pullulan as the starting material of the inventive preparation method should have an average molecular weight in the range from 50,000 to 10,000,000 and is selected from those having a molecular weight in this range depending on the intended application of the product. For example, the molecular weight of the starting pullulan should preferably be high when a high mechanical strength is required for the film prepared from the siloxane-containing pullulan. Such a high molecular-weight pullulan can be prepared biochemically, as is disclosed in Japanese Patent Kokai 5-328988, by culturing a microorganism such as *Aureobasidium pullulans* in a liquid culture medium followed by a heat treatment of the liquid culture at 50° to 75° C. for 0.3 to 3 hours. Various grades of pullulan products are available on the market and can be used as such as the starting material in the present invention.

The other reactant to be reacted with the glucosic hydroxy groups in the pullulan is an isocyanato group-containing organopolysiloxane represented by the above given general formula (IV). In the formula, the groups denoted by $R^1$ are, each independently from the others, a monovalent hydrocarbon group having 1 to 10 carbon atoms exemplified by alkyl groups such as methyl, ethyl, propyl, butyl, octyl and decyl groups, cycloalkyl groups such as cyclopentyl and cyclohexyl groups, aryl groups such as phenyl and tolyl groups, aralkyl groups such as benzyl and 2-phenylethyl groups and alkenyl groups such as vinyl and allyl groups as well as those substituted hydrocarbon groups obtained by replacing a part or all of the hydrogen atoms in the above named unsubstituted hydrocarbon groups with halogen atoms such as chloromethyl and 3,3,3-trifluoropropyl groups. It is preferable in most applications that all of the groups denoted by $R^1$ are methyl groups.

Since the subscript n is preferably 3 and $R^1$ and $R^2$ are each preferably a methyl group in the general formula (IV), a preferable starting isocyanato group-containing organosiloxane compound is represented by the general formula

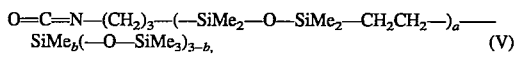

$$O=C=N-(CH_2)_3-(-SiMe_2-O-SiMe_2-CH_2CH_2-)_a-SiMe_b(-O-SiMe_3)_{3-b}, \quad (V)$$

in which Me is a methyl group and the other symbols each have the same meaning as defined before.

In the first aspect of the invention, in particular, the subscript a is 0 so that the above given general formula (V) is converted into a formula

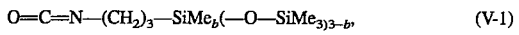

$$O=C=N-(CH_2)_3-SiMe_b(-O-SiMe_3)_{3-b}, \quad (V-1)$$

while, in the second aspect of the invention, the subscript a is 1 and the subscript b is 2 so that the general formula (V) is converted into a formula

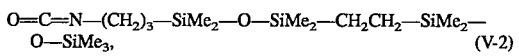

$$O=C=N-(CH_2)_3-SiMe_2-O-SiMe_2-CH_2CH_2-SiMe_2-O-SiMe_3, \quad (V-2)$$

in which each symbol has the same meaning as defined above. A particularly useful isocyanato group-containing organosiloxane according to the first aspect is tris(trimethylsiloxy)silylpropyl isocyanate, referred to as TMSI hereinafter, which is a compound of the above given formula (V-1) in which the subscript b is zero. These isocyanato group-containing organosiloxanes can be prepared according to the disclosure, for example, in Japanese Patent Kokai 63-250391 and 1-275587.

The amount of the isocyanato group-containing organosiloxane compound to be reacted relative to the amount of the pullulan naturally depends on the desired degree of substitution of the glucosic hydroxy groups in the pullulan in consideration of the particular intended application of the reaction product. As a general rule, use of an excessively large amount of the isocyanato group-containing organosiloxane compound is economically disadvantageous in addition to the difficulty caused in the purification of the reaction product. For example, the amount in moles of the starting organosiloxane compound should not exceed twice the moles of the overall glucosic hydroxy groups in the starting pullulan. On the other hand, the reaction product would not exhibit the desired unique properties as a combination of the properties inherent in the pullulan and the silicone compound when the amount of the siloxane reactant is too small, for example, to be 0.1 mole or smaller per mole of the glucosic hydroxy groups in the pullulan.

The reaction utilized in the method of the present invention is a so-called urethanation reaction proceeding between a hydroxy group and an isocyanato group to form a urethane linkage so that the reaction is very versatile and can proceed under a wide variety of reaction conditions without requiring special reaction conditions or special reaction apparatus. It is preferable, however, that the reaction is performed in a homogeneous solution prepared by dissolving the reactants in an organic solvent in order to ensure smooth proceeding of the reaction, increase of the reaction efficiency and control of the reaction. Examples of suitable organic solvents include esters such as methyl acetate, ethyl acetate, butyl acetate and isobutyl acetate, ketones such as acetone, methyl ethyl ketone, methyl isobutyl ketone, diisobutyl ketone and cyclohexanone, aromatic hydrocarbon solvents Such as benzene, toluene and xylene, ethers such as diethyl ether, dibutyl ether, tetrahydrofuran and dioxane and amides such as N,N-dimethyl formamide and N-methyl pyrrolidone. These organic solvents can be used either singly or as a mixture of two kinds or more according to need. The above mentioned amide solvents are preferable, of which N-methyl pyrrolidone is more preferable.

The urethanation reaction between the reactants can proceed even at room temperature but it is preferable to gently warm the reaction mixture at a temperature up to 150 ° C. depending on the organic solvent used as the reaction medium. The reaction is complete usually within 1 to 10 hours depending on the types of the reactants and various reaction conditions. It is optional to admix the reaction mixture with a catalytic compound having activity to celerate the conventional urethane-forming reactions including amine compounds such as triethylamine, triethylenediamine and N-methylmorpholine and organic metal compounds such as di-n-butyl tin dilaurate and tin (II) oleate. After completion of the reaction, the reaction mixture is poured into a large volume of water or methyl alcohol to precipitate the reaction product which is collected by filtration, washed with water or methyl alcohol and dried to give the desired siloxane-containing pullulan which is, for example, a pullulan tris(trimethylsiloxy)silylpropyl carbamate, when the isocyanato group-containing organosiloxane is TMSI, expressed by the formula

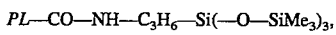

$$PL-CO-NH-C_3H_6-Si(-O-SiMe_3)_3,$$

in which the symbol PL has the same meaning as defined above.

In the following, the method of the present invention and characterization of the thus obtained siloxane-containing pullulan of the invention are described in more detail by way of examples.

EXAMPLE 1

A solution was prepared by dissolving 10 g of pullulan having an average molecular weight of about 20,000 (PF-20, a product by Hayashihara Shoji Co.) after drying at 105° C. for 2 hours and 0.94 g of triethyl amine in 300 ml of N-methyl pyrrolidone at 100° C. Into this solution kept at this temperature under agitation were added dropwise 70.5 g of TMSI followed by further continued agitation for 2 hours at a temperature of 100° to 110° C. to complete the urethanation reaction. The thus obtained reaction mixture was poured into 1000 ml of water to form a precipitated material which was collected by filtration, repeatedly washed first with water and then with methyl alcohol and dried to give 58 g of the reaction product which contained 24.4% by weight of silicon according to the result of the elementary analysis corresponding to a degree of substitution of 2 or, namely, to such an extent of substitution that two on an average of the three hydroxy groups in each glucose unit of the pullulan molecules had been substituted by the silylpropyl carbamido groups.

The infrared absorption spectrum of this product is shown in FIG. 1 which supports that the product contains a —O—CO—NH-linkage to which the absorption band at 1743 cm$^{-1}$ can be assigned. Further, the reaction product was subjected to the analysis by the $^{13}$C-NMR in CDCl$_3$ as the solvent. The results of the measurement of δ, ppm, were that the value for G1 was 97 ppm and the values for G2 to G6 were each 60 to 80 ppm, G1 to G6 being the carbon atoms at the 1-position to the 6-position, respectively, in the glucose unit of pullulan. The δ values for the carbon atoms in the substituent group were as follows.

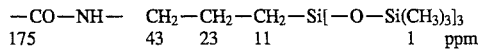

| —CO—NH— | CH$_2$—CH$_2$—CH$_2$—Si[—O—Si(CH$_3$)$_3$]$_3$ |
|---|---|
| 175 | 43   23   11                          1  ppm |

These results supported the conclusion that the thus obtained product was a pullulan tris(trimethylsiloxysilyl)propyl carbamate.

Further, the product was dissolved in toluene to give a solution from which a film having a thickness of 50 μm was prepared by the solution-casting method to find that the film was tough with good elasticity. The oxygen permeability coefficient of this film was 1.4×10$^{-8}$ cm$^3$(STP)·cm/cm$^2$·sec·mmHg at 25° C. suggesting that the film would be useful as a gas separation membrane.

EXAMPLE 2

The isocyanato group-containing organosiloxane compound used as the reactant in this example was a compound expressed by the formula O=C=N—C$_3$H$_6$—SiMe$_2$—O—SiMe$_2$—C$_2$H$_4$—SiMe$_2$—O—SiMe$_3$, in which Me is a methyl group, and synthesized by the hydrosilation reaction in the presence of a platinum catalyst between 1-(3-isocyanatopropyl)-3-vinyl-1,1,3,3-tetramethyl disiloxane and pentamethyl disiloxane according to a known procedure.

Thus, 10 g of the same pullulan as used in Example 1 after drying at 105° C. for 2 hours and 1.2 g of di-n-butyl tin dilaurate were dissolved in 200 ml of N-methyl pyrrolidone at 100° C. to form a solution, into which 72.4 g of the above described isocyanato group containing organosiloxane compound were added dropwise under agitation followed by further continued agitation of the reaction mixture for 2 hours at 100° to 110° C. and addition of 200 ml of toluene to continue the reaction for 3 hours. After completion of the reaction, the reaction mixture was poured into 1000 ml of methyl alcohol under agitation to precipitate the reaction product which was collected by filtration and washed repeatedly first with methyl alcohol and then with water followed by drying to give 55.2 g of a dried reaction product which contained 23.8% by weight of silicon according to the result of the elementary analysis corresponding to a degree of substitution of 2 or, namely, to such an extent of substitution that two on an average of the three hydroxy groups in each glucose unit of the pullulan molecules had been substituted by the silylpropyl carbamido groups.

Figure 2:
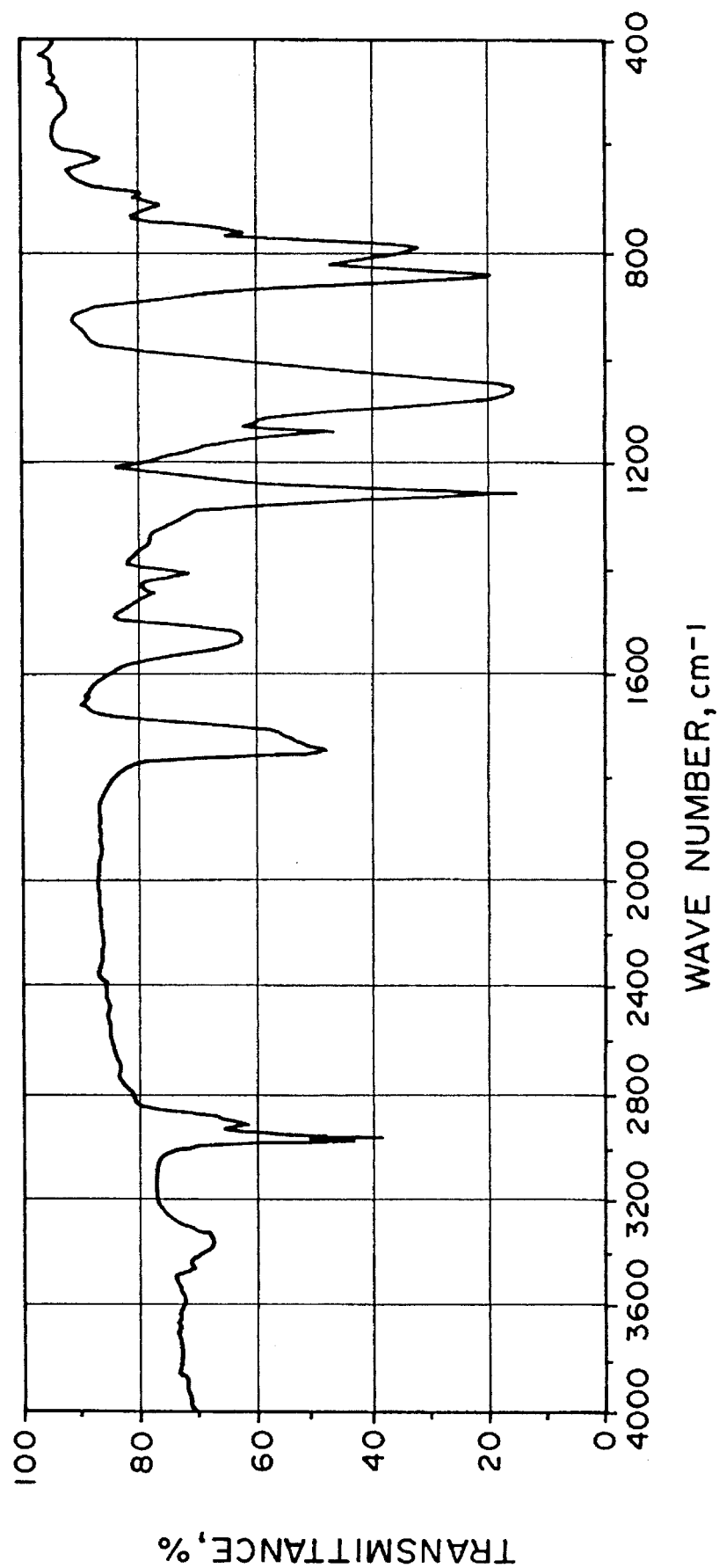

The infrared absorption spectrum of this product is shown in FIG. 2 which supports that the product contains a —O—CO—NH-linkage to which the absorption band at 1741 cm$^{-1}$ can be assigned. Further, the reaction product was subjected to the analysis by the $^{13}$C-NMR in CDCl$_3$ as the solvent. The results of the measurement of δ, ppm, were that the value for G1 was 97 ppm and the values for G2 to G6 were each 62 to 80 ppm, G1 to G6 being the carbon atoms at the 1-position to the 6-position, respectively, in the glucose unit of pullulan. The δ values for the carbon atoms in the substituent group were as follows.

| —CO—NH— | CH$_2$—CH$_2$—CH$_2$—Si(CH$_3$)$_2$—O— | Si(CH$_3$)$_2$— |
|---|---|---|
| 156 | 44   24   16                          2 | 2 |

| —CH$_2$—CH$_2$—Si(CH$_3$)$_2$—O—Si(CH$_3$)$_2$—CH$_3$ |
|---|
| 10   10      2                         2         2 ppm |

These results supported the conclusion that the thus obtained product was a pullulan substituted by the carbamato groups of the above given formula.

What is claimed is:

1. A siloxane-containing pullulan which is a compound having a molecular weight in the range from 50,000 to 10,000,000 and represented by the general formula

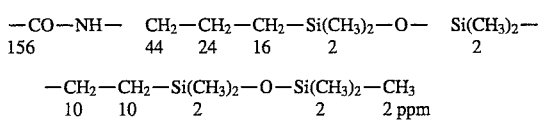

PL—CO—NH—(CH$_2$)$_n$—(—SiR$^1$$_2$—O—SiR$^1$$_2$—CH$_2$CH$_2$—)$_a$——SiR$^1$$_b$ (—O—SiR$^2$$_3$)$_{3-b}$, in which PL— denotes a glucose residue of pullulan, each R$^1$ is a monovalent hydrocarbon group having 1 to 10 carbon atoms, each R$^2$ is a monovalent hydrocarbon group having 1 to 10 carbon atoms or a triorganosiloxy group represented by the general formula —O—SiR$^3$$_3$, each R$^3$ being a monovalent hydrocarbon group having 1 to 8 carbon atoms, the subscript n is a positive integer not exceeding 10, the subscript a is 0 or 1 and the subscript b is 0, 1 or 2.

2. The siloxane-containing pullulan as claimed in claim 1 in which the subscript a is zero.

3. The siloxane-containing pullulan as claimed in claim 2 in which R$^2$ is a monovalent hydrcarbon group and the subscript b is zero.

4. The siloxane-containing pullulan as claimed in claim 1 in which the subscript a is 1 and the subscript b is 2.

5. The siloxane-containing pullulan as claimed in claim 1 in which the subscript n is 3.

6. The siloxane-containing pullulan as claimed in claim 1 in which R$^1$, R$^2$ and R$^3$ are each a methyl group.

7. A method for the preparation of a siloxane-containing pullulan which is a compound having a molecular weight in the range from 50,000 to 10,000,000 and represented by the general formula PL—CO—NH—(CH$_2$)$_n$—(—SiR$^1$$_2$—O—SiR$^1$$_2$—CH$_2$CH$_2$—)$_a$——SiR$^1$$_b$ (—O—SiR$^2$$_3$)$_{3-b}$, in which PL- denotes a glucose residue of pullulan, each R$^1$ is a monovalent hydrocarbon group having 1 to 10 carbon atoms, each R$^2$ is a monovalent hydrocarbon group having 1 to 10 carbon atoms or a triorganosiloxy group represented by the general formula —O—SiR$^3$$_3$, each $R^3$ being a monovalent hydrocarbon group having 1 to 8 carbon atoms, the subscript n is a positive integer not exceeding 10, the subscript a is 0 or 1 and the subscript b is 0, 1 or 2, which comprises the step of:

reacting an isocyanato group-containing organopolysiloxane represented by the general formula

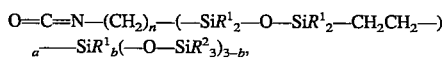

$$O=C=N-(CH_2)_n-(-SiR^1{}_2-O-SiR^1{}_2-CH_2CH_2-)_a-SiR^1{}_b(-O-SiR^2{}_3)_{3-b},$$

in which each symbol has the meaning as defined above, with the glucosic hydroxy groups in a pullulan.

8. The method for the preparation of a siloxane-containing pullulan as claimed in claim 7 in which the reaction of the isocyanato group-containing organopolysiloxane and the pullulan is performed in an organic solvent as the reaction medium.

9. The method for the preparation of a siloxane-containing pullulan as claimed in claim 8 in which the organic solvent is an amide compound.

10. The method for the preparation of a siloxane-containing pullulan as claimed in claim 9 in which the amide compound is N-methyl pyrrolidone.

* * * * *